US008489244B2

(12) United States Patent  
Cao et al.

(10) Patent No.: US 8,489,244 B2  
(45) Date of Patent: Jul. 16, 2013

(54) METHOD, CONTROLLER AND SYSTEM FOR CONTROLLING THE SLUG FLOW OF A MULTIPHASE FLUID

(75) Inventors: Yi Cao, Cranfield (GB); Liyun Lao, Cranfield (GB); Hoi Yeung, Cranfield (GB)

(73) Assignee: Cranfield University, Cranfield (GB)

( * ) Notice: Subject to any disclaimer, the term of this patent is extended or adjusted under 35 U.S.C. 154(b) by 552 days.

(21) Appl. No.: 12/748,310

(22) Filed: Mar. 26, 2010

(65) Prior Publication Data

US 2010/0307598 A1    Dec. 9, 2010

(30) Foreign Application Priority Data

Mar. 28, 2009    (GB) .................................. 0905375.2

(51) Int. Cl.  
*G06F 19/00*    (2011.01)

(52) U.S. Cl.  
USPC ................................ 700/282; 700/281; 137/2

(58) Field of Classification Search  
USPC .................. 700/275, 281, 282; 137/1, 2, 171, 137/187, 455  
See application file for complete search history.

(56) References Cited

U.S. PATENT DOCUMENTS

| | | | |
|---|---|---|---|
| 5,544,672 A | 8/1996 | Payne | |
| 7,156,116 B2 * | 1/2007 | Lu | 137/14 |
| 7,412,472 B2 * | 8/2008 | Lu | 708/322 |
| 2002/0029883 A1 * | 3/2002 | Vinegar et al. | 166/250.15 |
| 2002/0126021 A1 * | 9/2002 | Vinegar et al. | 340/854.3 |
| 2003/0164240 A1 * | 9/2003 | Vinegar et al. | 137/155 |
| 2004/0263350 A1 * | 12/2004 | Vinegar et al. | 340/854.4 |
| 2006/0122734 A1 | 6/2006 | Coward | |

FOREIGN PATENT DOCUMENTS

| | | |
|---|---|---|
| GB | 2 358 205 A | 7/2001 |
| GB | 2 429 797 A | 3/2007 |
| WO | 02/46577 A1 | 6/2002 |
| WO | 2009/133343 A1 | 11/2009 |

OTHER PUBLICATIONS

U.K. Search Report Under Section 17 mailed Jul. 28, 2009, issued in corresponding U.K. Application No. GB 0905375.2, filed Mar. 28, 2009, 1 page.  
U.K. Search Report Under Section 17 mailed Jun. 23, 2010, issued in corresponding U.K. Application No. GB 1005096.1, filed Mar. 26, 2010, 1 page.  
U.K. Further Search Report Under Section 17 mailed Jan. 28, 2011, issued in corresponding U.K. Application No. GB 1005096.1, filed Mar. 26, 2010, 1 page.

* cited by examiner

*Primary Examiner* — Charles Kasenge  
(74) *Attorney, Agent, or Firm* — Christensen O'Connor Johnson Kindness PLLC

(57) ABSTRACT

A method of controlling the flow of a multiphase fluid through a pipeline that includes a riser pipe with a choke valve comprises receiving multiple signals dependent on fluid flow properties from a plurality of sensors in the topside area of the riser pipe, analysing the signals to establish a vector of measurement weights, the product of the vector of measurement weights and a corresponding vector of the signal values of a given time being dependent on the severity of a slug flow forming in the system. Further signals dependent on fluid flow properties are received from the plurality of sensors in the topside area of the riser pipe. A set position for the choke valve is then determined from the product of the vector of measurement weights and further values of signals to restrict characteristics of the flow in the topside from moving towards a severely slugging flow regime.

23 Claims, 12 Drawing Sheets

METHOD, CONTROLLER AND SYSTEM FOR CONTROLLING THE SLUG FLOW OF A MULTIPHASE FLUID

CROSS-REFERENCE TO RELATED APPLICATION

This application claims priority of GB 0905375.2, filed Mar. 28, 2009, which is herein incorporated by reference in its entirety.

BACKGROUND

This invention relates to a method, a controller and a system for controlling slug flow of a multiphase fluid comprising gas and liquid in a conduit, such as a riser pipeline, the pipeline being provided with a control valve with a variable aperture which enables the conduit to be constricted. The method, controller and system may be arranged to prevent the excessive growth of slug flow by choking the flow by varying the aperture of the valve.

There are many applications in which fluid is required to flow through conduits which include riser pipelines, but perhaps one of the most challenging applications is the extraction of fluid under relatively low pressures from wells in the gas and oil industry. In the case of wells located on a seabed there may be a considerable rise of the fluid from the base of the riser to the processing apparatus on the sea surface. Low pressures are typically present where a well is nearing the end of its useful life, a so called brown oil field, and under such conditions it is common for the flow of fluid in a riser pipeline to give rise to slug flow.

Slug flow is troublesome to offshore oil production systems, because it leads to sudden and generally cyclical surges in the flow of liquid (e.g. oil) and gas from the riser pipeline to subsequent processing apparatus located topside of the pipeline, e.g. downstream of the top of the pipeline. Because of the problems of slug flow, wells are often considered to have reached the end of their useful life sometime before they are exhausted simply because of the low pressures which give rise to troublesome slug flows.

Many attempts have been made to prevent the formation of slug flow in order to make it viable to extract from low pressure wells (the problem also occurs with high pressure wells but is less prominent). Known solutions focus on active control of the flow by opening and closing a control valve, or choke valve, located at the topside of the riser pipeline. This has been shown to be effective in preventing the formation of severe slugs but it inevitably reduces the overall flow rate through the pipeline when measured over an extended period of time. Since the profitability of the system depends on getting out as much oil and gas as quickly as possible this loss of flow is disadvantageous. Furthermore, many current systems of flow control using choking rely upon the measurement of pressure from the base of the riser being available. This is unsatisfactory as it is expensive to install sensing devices at the riser base, especially in deep seas, and there are obvious difficulties with maintaining the sensors in such a location. For hydrodynamic slugs, due to the small size of slugs, the riser base pressure can only provide an average measurement over many slugs in the riser, hence the instability in the system cannot properly be observed.

SUMMARY

It is therefore an object of the present invention to provide an improved method and apparatus for controlling the flow of fluid which is especially suitable for use in the oil and gas industries when working with low pressure, possibly end of life, wells, or wells which suffer from hydrodynamic slugs.

According to a first aspect the invention provides a method of controlling the flow of a multiphase fluid through a pipeline of the kind in which a riser pipe is fitted with a choke valve which can be moved between an open position in which fluid can flow through the choke valve and a more closed position in which the flow of fluid through the valve is at least partially choked, the method comprising the steps of:

in a first stage receiving multiple signals dependent on fluid flow properties from a plurality of sensors in the topside area of the riser pipe, analysing the signals to establish a vector of measurement weights derived from sampled values of the multiple signals, the product of the vector of measurement weights and a corresponding vector of the signal values of a given time being dependent on the severity of a slug flow forming in the system at that time, and in a second stage receiving further signals dependent on fluid flow properties from the plurality of sensors in the topside area of the riser pipe, in a third stage determining a set position for the choke valve from the product of the vector of measurement weights and the further values of signals, and moving the choke valve to the set position in order to restrict characteristics of the flow in the topside from moving towards a severely slugging flow regime.

The first, second and third stages may be carried out in that order. Once the third stage is completed the method may return to the second stage, whereafter it may loop continuously between the second and the third stages as long as the controller is online.

The method may comprise in the first stage, prior to collecting the samples to be analysed, setting a manual choke valve position and subsequently performing the step of analysing sampled values of the signals with the valve held in that position to determine the set of weightings that forms the vector of measurement weights.

The method may set the position of the choke valve according to a function of the following form:

$$V = V_0 + K(W^T Y - R)$$

where V is the choke valve position, $V_0$ is the valve set-point, K is the control gain, W is the vector of measurement weights, Y is a vector of measurements and R is the set-point of the control variable, $W^T Y$.

The valve set-point $V_0$ is a constant to be added to the controller output to give the control valve position. The valve set-point may be determined based on the manually set choke valve position where slug flow fluctuation can be reduced to a manageable level.

The control gain may be used to multiply the difference between the control variable and its set-point to give the controller output, which then is added with the valve set-point to give the valve position. The control gain may be tuned using any existing tuning techniques to stabilise the flow fluctuation.

The control variable $W^T Y$ may represent a principal component which is a linear combination of weighted variables, each corresponding to one of the received signals. The measured signals may be optimally weighted through multivariate analysis techniques such as principal component analysis (PCA). These variables may exclude the valve opening and may be initially measured when the valve is set manually at a preferred position to observe how the signals vary with slug flow, assuming that slug flow is the dominant, or perhaps sole, contributor to any change in the signals during the measurement period.

The vector of measurement weights may be determined from samples of the signals obtained over an extended period of time. This time may correspond to at least 2 or more periodic cycles of slug flow in a manually set system (e.g. with the choke valve set manually at a fixed position and with the slug control inoperative).

The method therefore enables the flow to be controlled to prevent the build up of slug flow through the implementation of a control strategy for movement of the valve based on the interpretation of a combination of signals obtained topside through PCA techniques. In effect the method comprises finding a good variable for control using measurements from sensors, the variable being sensitive to slug flow. From multivariate statistics theory, it is known that variation directions in signals can be represented by several linear combinations (typically principle components) of the signals through PCA.

By controlling the valve around a manually set valve point, the valve will generally be opened more than it would manually, improving the flow rate over a given period of time.

The method may select the first principle component at any time as the control variable vector, this being the most sensitive of the principle components. Of course, one or more of the other principal components could be used or a combination of more than one principal component could be used.

The applicant has appreciated that such a novel method enables a high degree of control to be achieved without the need for measurements obtained upstream of the riser.

The method may comprise processing only signals from sensors located at the topside of the pipeline. It has been found that the method of the invention provides very satisfactory results without the need for sensors located at the riser base to be provided.

The method may employ signals output from one or more of the following (the list not being exhaustive):

a liquid level sensor which produces an output indicative of the level of the liquid in the first stage separator provided downstream of the control valve;

a first pressure sensor which measures the pressure of the fluid within the first stage separator;

a first flow meter which measures the rate of flow of gas from the separator in the first stream;

a second flow meter which measures the rate of flow of liquid out of the separator in the second stream, a pressure sensor which measures the pressure of the gas stream flowing out of the separator;

a pressure sensor which measures the pressure of the liquid stream flowing out of the riser pressure sensor which measures the pressure drop across the control valve, a sensor which measures the fluid density at the riser outlet (e.g. at the downstream end of the riser pipe), and a sensor measuring the fluid mass flow rate at the downstream end of the riser pipeline.

The signals may comprise raw data signals from the sensors, and need not be actual measurements and thus need not be calibrated. All that is needed is that the signals vary as a function of slug flow in some way.

Preferably the method processes outputs from at least two or more sensors. The higher the number of sensors the more sensitive the first principal component is likely to be to slug flow, and therefore, the higher the valve set-point can be and the higher the production can achieve.

The control strategy may comprise operating the control valve using a closed loop control, and as such the processor unit may receive a signal indicative of the position of the valve. The choke valve may be automated so that it moves in response to control signals, or may be manually operated by an operator receiving control instructions.

The method may employ all available topside measurements from any provided sensors.

In a fourth stage, to be performed after the first and second stages are complete, the method may comprise monitoring over an evaluation period of time the valve position and one or more of the signals when the choke valve is under control of the method of the invention and updating the initial valve set point, and additionally or alternatively the control variable set point, and additionally or alternatively the control gain, and additionally or alternatively one or more of the weightings of the vector of measurement weights in response to the monitoring.

The fourth stage may be performed periodically or continuously whilst the method is looping between the second and third stages.

This fourth stage of monitoring and updating the control parameters may be repeated periodically during operation of the system to enable it to adapt to changes of the system.

During the monitoring and updating stage, the control variable set-point may be adjusted to a point derived by averaging the control variable over an evaluation period and is to be used as the target of the control variable for the controller to adjust the control valve.

Therefore the applicant has appreciated that in use the method may comprise measuring the position of the control valve and may use this to revise the control strategy over time. This may be based on a partial least squares (PLS) regression algorithm After the initial set-up, real-time measurements and corresponding valve position readings may be collected and this information used to update control parameters so that the controller can follow future flow condition changes and to improve production. The update is based on closed-loop identification algorithms, such as PLS and subspace algorithms. The PLS technique maximize the variation dependence between the control valve position and measurements so that the control variable can be kept as the most sensitive when flow condition changes. Meanwhile, the optimal valve position can be determined based on the relationship identified by the PLS algorithm to maximize production.

Alternatively, the method may be performed in an open-loop without updating the control parameters.

According to a second aspect the invention provides a controller suitable for use in controlling multiphase fluid flow in a pipeline comprising:

receiving means arranged to receive during a first period of time multiple signals dependent on fluid flow properties from a plurality of sensors in the topside area of the riser pipe, analysing means arranged to analyse the signals to establish a vector of measurement weights derived from sampled values of the multiple signals, the product of the vector of measurement weights and a corresponding vector of the signal values of a given time being dependent on the severity of a slug flow forming in the system at that time, and in which the receiving means is arranged to receive further signals dependent on fluid flow properties from the plurality of sensors in the topside area of the riser pipe at a second period of time later than the first period of time, determining means arranged to determine a set position for the choke valve from the product of the vector and the further values of signals, and valve actuation means arranged to move the choke valve to the set position in order to restrict characteristics of the flow in the topside from moving towards a severely slugging flow regime.

The vector of measurement weights may comprise a principal component formed from a linear weighted combination of measurements whose value is sensitive to slug flow. It may comprise the first principal component.

The controller may include means for storing a control gain value, and valve set point value and a control variable set point value, and may be arranged to produce the choke valve control signal according to a function of the form:

$$V = V_0 + K(W^T Y - R)$$

The controller may be arranged to perform any of the methods according to the first aspect of the invention.

According to a third aspect the invention provides a system for use in controlling the flow of a multiphase fluid through a pipeline comprising:

a riser pipe which is fitted with a choke valve which can be moved between an open position in which fluid can flow through the valve and a more closed position in which the flow of fluid is at least partially choked, a plurality of sensors, each producing a signal dependent on the fluctuation of the fluid flow properties in the topside area of the riser pipe, a control unit receiving signals from the sensors and controlling the movement of the control valve, in which the control unit includes a processor running a program in the control unit which analyses the measurements to establish a weight vector for the corresponding measurements, and which subsequently derives a control variable from the product of the weight vector and sampled values of the signals, the control variable comprising an indication of the severity of a slug flow forming in the system, and in which the choke valve is arranged to receive signals from the control unit, the signals being dependent on the control variable in order to restrict the characteristics of the flow in the topside moving towards a severely slugging flow.

The system may be arranged to perform any of the methods according to the first aspect of the invention.

According to a fourth aspect the invention provides a data carrier including a set of program instructions which when operating on a processing apparatus cause the apparatus to function as the controller of the second aspect of the invention.

DESCRIPTION OF THE DRAWINGS

There will now be described, by way of example only, one embodiment of the present invention with reference to and as illustrated in the accompanying drawings of which.

DETAILED DESCRIPTION

Figure 1:
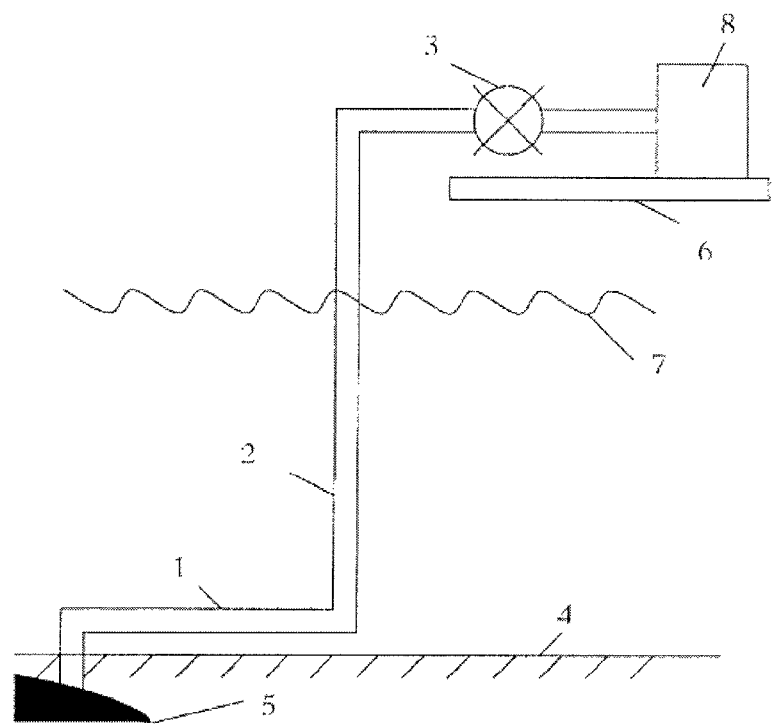
FIG. 1 is an illustration of a typical brown oil field with a rise pipeline for extracting a multiphase fluid flow including a general illustration of the processing apparatus provided downstream of the riser pipeline at the top side.

FIG. 1 illustrates a generic and highly simplified example of an industrial arrangement for the extraction of oil and gas from a subterranean well 5 to which the present invention may be applied. It comprises a conduit 1,2 through which a multiphase fluid will flow, connected at an upstream end to the well on a sea bed 4 and at its downstream end to processing apparatus 8 on a rig or ship located at the sea surface 7. The well is connected to the processing apparatus through a conduit which includes a length of pipeline that is horizontal or slightly downwardly inclined from the well head to the base of a riser pipeline 2 which rises vertically to the surface. At the top of the riser pipeline 2, a downstream end of the conduit, is a control valve 3. This valve 3 can be moved to a range of positions between a fully open position in which it does not impede flow of fluid out of the riser pipeline and a fully closed position in which substantially no fluid can flow out of the downstream end of the riser pipeline. The valve is operated by a motor under control of a motor controller (not shown) which responds to instructions from a slug controller embodying part of a plant control system. As will become apparent, the opening and closing of the valve 3 can be used to prevent the growth of slug-like flow in the pipeline. The function of the slug controller of the present invention, and its method of operation, is to control the movement of the valve to choke the flow of fluid flowing through the riser in such a manner that excessive slug flow does not arise.

The processing apparatus 8 at the top of the riser is invariably designed so that it can cope with a limited amount of slug flow. The processing apparatus may have many different forms, but one typical arrangement is shown in more detail in FIG. 2 of the accompanying drawings. At its heart is a separator unit 10 which receives the fluid flowing from the riser pipeline and which separates the fluid into two or three streams. A first stream 11 comprises substantially only gas which is fed to a first outlet at the top of the separator. A second stream 12 is substantially only liquid, which is taken out from an outlet at the bottom of the separator. In some applications, the second stream 12 may split into two streams, a water dominated and a oil dominated.

To monitor and to control the flow of fluid into the separator and out through its outlets to keep the surge volume (the slug flow) below a predetermined level the control valve 3 opening is restricted so as to choke the flow of fluid. The processing apparatus also typically includes several sensors (not shown) which monitor the flow parameters in the topside area of the pipeline and enable the operation of the processing apparatus to be monitored.

In use, the flow of fluid into the separator 10 must ensure that the separator does not fill up too rapidly with either gas or liquid or both, to ensure the separator does not fail. Separate gas and liquid flow valves 13,14 are provided for each of the two streams which are controlled by a plant control system 16 that also controls the choke valve 3.

The amount of acceptable slug flow varies from application to application, but it is often expressed as a fraction of the total volume of the separator unit. To quantify the severity of gas and liquid flow surges, the surge volume criterion may be defined. This is the minimum volume required by the downstream production facility to deal with the aforementioned gas and liquid flow surges. Obviously, such a volume will also depend on the separator pressure and level controllers.

A separator 10 with well tuned controllers may require less volume than one with controllers out of tuned to cope with the same flow surges. To avoid the complexity to involve separator controllers, it is assumed that the processing flow rate of the downstream production facility is fixed at the average of the riser outlet flow rate, i.e.

$$\bar{q} = \frac{1}{T}\int_0^T q(t)dt$$

where q(t) is the flow rate at the outlet of the choke valve, T is the evaluation period and $\bar{q}$ is the average flow rate constantly processed by the downstream production facility.

The surge volume is defined as the maximum value along the time integration of $q(t)-\bar{q}$, $$V_s = \max_{T_1, T_2}\left|\int_{T_1}^{T_2}(q(t)-\bar{q})dt\right|$$

where $V_s$ is the surge volume, $T_1$ and $T_2$ define an arbitrary integration period and to be determined by the maximisation. The absolute value means both positive volume and negative volume are equally important.

Figure 14:
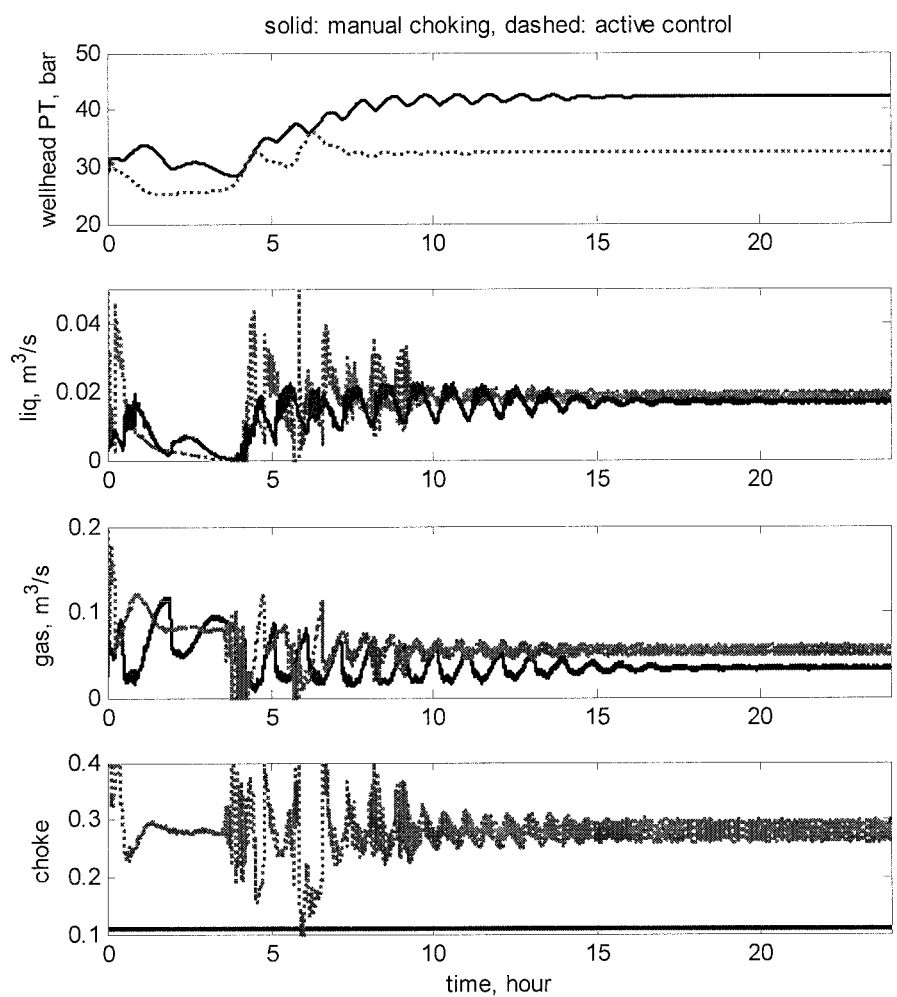

This definition can be explained by the example shown in FIG. 14. The average flow rate of the example is 1 m³/h. The integration of the difference between the flow rate and its average along the time is the cumulated area marked as grey. Areas above the average line are positive and below are negative. Therefore, an area becomes the maximum if $T_1$ starts from one of the crossing point and $T_2$ finishes at next crossing point. In other words, the surge volume is defined as the maximum area of these red marked areas between two neighbouring crossing points within the evaluation time, T.

The outputs of all of the sensors are digitised by the plant controller 16 before being fed to input ports of the slug controller 15. The digitised output signals each comprise a stream of digital samples whose values will vary as the system operates due to slugging and these samples are buffered in an area of memory accessible by the slug controller for processing.

Figure 2:
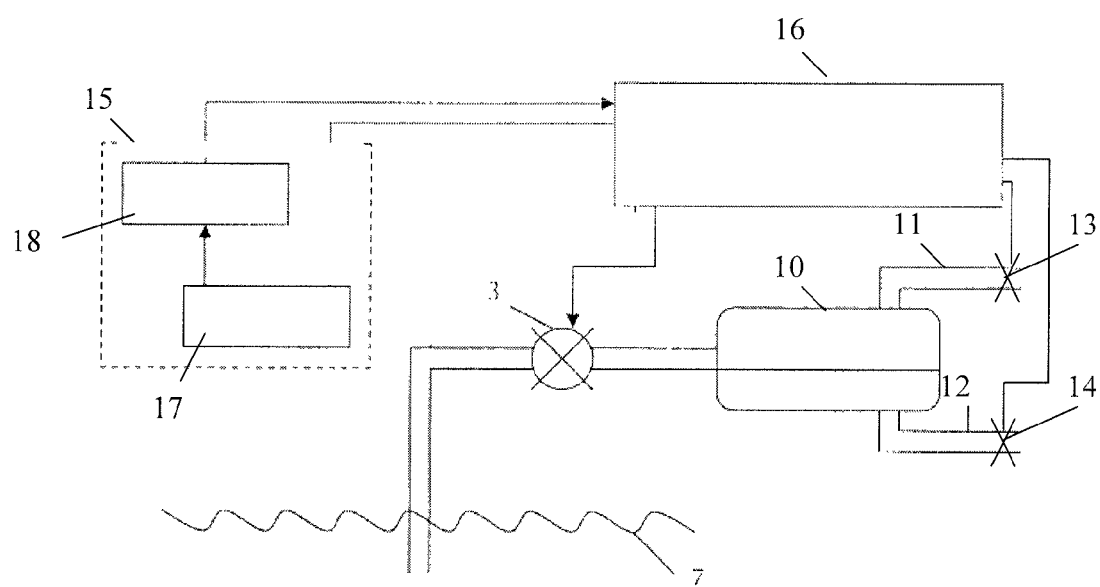
FIG. 2 is a schematic view in detail of the generic processing apparatus of FIG. 1 which represents and embodiment of the present invention.
Figure 3:
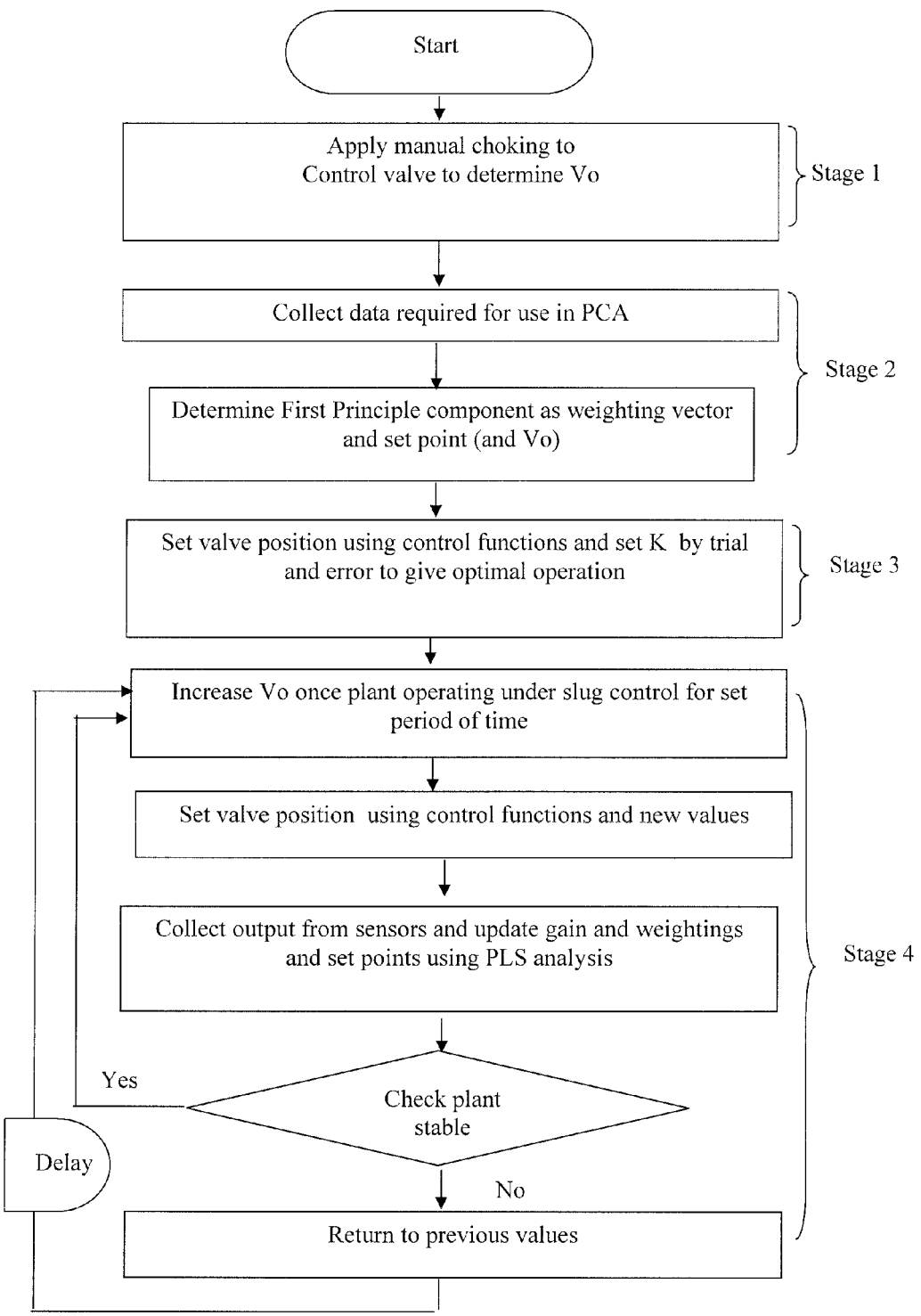
FIG. 3 is a flowchart of the steps performed by the processing apparatus of FIG. 2 when the oil field is online.

The slug controller 15 includes a processor 17 which carries out instructions from a computer program, which is also stored in an area of memory 18 accessible by the processor. When running on the processor, the program causes the processor to process the buffered data to provide a control variable for use by the slug controller to control the operation of the choking valve. This variable is passed back to the plant controller which instructs the valve actuator that controls the choke valve as shown in FIG. 2. It could, however, have direct control of the choke valve. The program causes the apparatus to carry out various operations so that the following stages are performed (as shown in the flowchart of FIG. 3).

Stage 1—Manual Initiation Step

Initially, when the apparatus is first commissioned the slug controller is installed but is left inoperative and the choke valve is set manually. As fluid flows, the slugging in the riser is observed and the choke valve is manually closed down until such a point that the slugging is considered to be as severe as it can be without effecting the operation of the system. For instance, it may be considered to be at this level if the slug volume is equal to $\frac{1}{10}^{th}$ of the capacity of the separator. This generally requires some trial and error to find the right setting for the valve. Having found this setting, the valve position is noted as a value Vo and the valve is left in that position.

Stage 2—Initial Measurement Step and Control Parameter Evaluation

Once the valve has been set manually to Vo, the controller starts to take sample measurements from the plant controller over a period of time equal to several slugging cycles. From these measurements the processor determines the first principal component of the output signals received from the sensors using principal component analysis (PCA) which corresponds to severity of slug flow in the system. This first principal component will comprise an eigenvector having the highest variability due to slug flow, and as such its value will vary with slug flow conditions. Generally, the higher the value of this component the more severe the slug flow, with a zero value indicating that there is no slug flow in the pipeline.

To minimise the impact of slug control on production, the choke valve needs to operate at a large opening position. However, such position may lead to unstable flow conditions. To stabilise flow at a large choke valve opening position requires the control variable to be the most sensitive to flow fluctuations. Mathematically, such a variable is called the principal component, which is a combination of selected measurements. Therefore, an algorithm based on principal component analysis (PCA) has been developed to calculate the measurement weights to compose the control variable for slug control. The PCA algorithm also gives the set-point of the control variable. Then, the control gain and choke valve set-point are determined by manually tuning. The actual choke valve position is determined by the following control low:

$$V = V_0 + K(W^T Y - R)$$

where V is the choke valve position, $V_0$ is the valve set-point, K is the control gain, W is a vector of measurement weights, Y is a vector of measurements and R is the control variable set-point. The composed control variable is an indirect measure of the severity of current slug flow condition. Hence, the new slug control scheme is referred to as the inferential slug control (ISC).

Stage 3—Automatic Valve Control Based on Control Parameters

Having derived the required valve position using the control formula, this position is then fed from the slug controller to the valve, or more correctly to an actuator which forms a part of the valve, which in use controls the opening and closing of the valve to the required position. As the requested valve position varies so the valve is moved to that position, choking the flow as required to limit slugging. The applicant has found that this enables the formation of severe slugs to be prevented whilst actually providing a higher overall flow rate than would be possible if the valve was simply left at its manually set position $V_0$.

Stage 4—System Optimisation and Updating of Control Parameters

Once the system is online and the choke valve is being opened and closed according to the control parameters, the valve set point is increased slightly whilst on line. The signals received by the slug controller from the plant controller, but additionally including a measurement of the valve position, are then further analysed to determine the influence of opening and closing the valve on the formation of slug flow by analysing the valve position and the other measurements using PC1.

With the ISC in operation, choke valve position and selected measurements are continuously recorded. A partial least square (PLS) regression based control update algorithm then uses this recorded data to update the control parameters ($V_0$, K, W and R) so that the slug controller is able robustly to follow the flow condition changes without manually retuning the controller. The update algorithm is also able to improve the control performance so that the impact on production is minimised.

There follows a description of two examples of implementation of the slug controller, firstly on a test rig available to the applicant and on a computer model simulating a real well field.

EXAMPLE 1

Test Using Cranfield Three-Phase Facility

Figure 4:
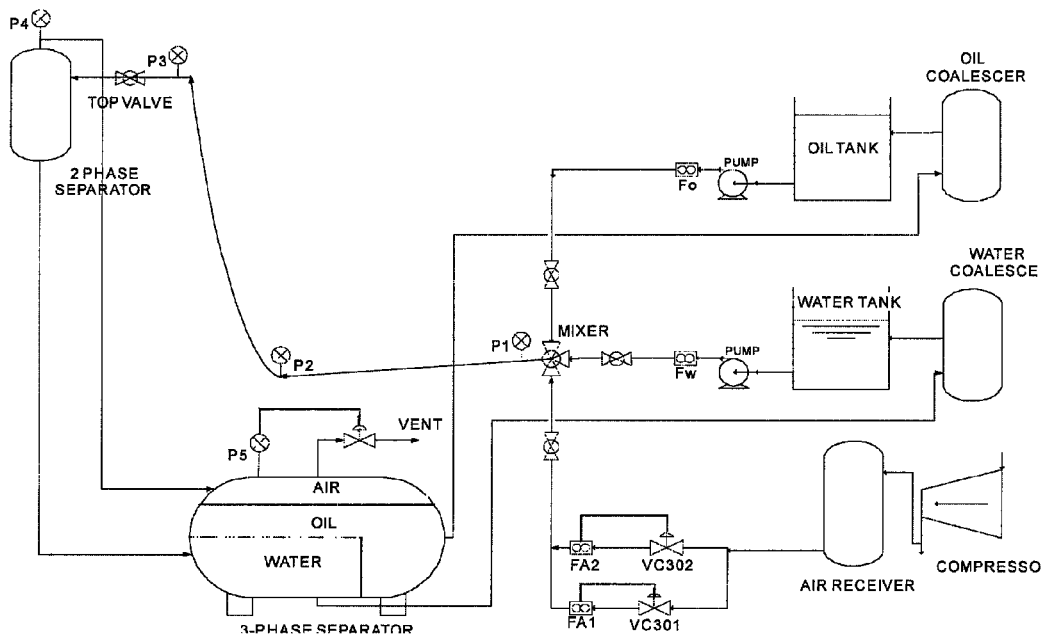
FIG. 4 is an overview of the Cranfield University test rig used to verify the operation of a slug controller which represents an embodiment of the present invention.

An experimental study was carried out on the three-phase facility at Cranfield University shown in FIG. 4. The facility is a fully automated high pressure test facility designed to supply a controlled and measured range of oil, water and air mixture from the flow metering area into the test area and finally into the phase separation area where the oil, water and air are separated in a horizontal three-phase gravity separator. After separation, the oil and water are cleaned in their respective coalescers before returning to their storage tanks while the air is exhausted into the atmosphere. The test facility is fully controlled by an industrial distributed control system (DCS).

Air is supplied from a bank of compressors connected in parallel. The air from compressors is accumulated in a large air receiver to reduce the pressure fluctuation from the compressor. Air from the receiver passes through a bank of three filters (coarse, medium and fine) and then through a cooler where debris and condensates present in the air are stripped from the air before it flows into the flowlines.

Water is supplied from a 12,500 litres capacity water tank while the oil is supplied from a bund oil tank of similar capacity. The water and oil are supplied to the flow loop by two multistage pumps. The pumps are operated remotely through the DCS system.

The flow rates of the air, water and oil can be regulated by their respective control valves. The water flow rate is metered by a magnetic flow meter and a Coriolis meter while the oil flow rate is metered by two Coriolis meters. The air is metered by a bank of two flow meters of ½" and 2" diameter respectively.

The air, water and oil are mixed in a mixer before entering the test section. To simulate the dip plus riser configuration, a typical pipeline configuration in offshore oil platform where severe slugging is likely to occur, the test section consists of a 55 m long, 2° downward inclined, 4" nominal diameter flow loop, joining into a catenary-shaped riser with a vertical height of 10.5 m. A horizontal 4" pipe, in which a riser top choke valve is installed, connects the riser top end to the inlet of a vertical two-phase separator where the air and liquid are separated.

The pressure and liquid level are controlled in the two-phase separator by a pressure controller and a radar gauge level controller maintained by the DCS system. The separated air and the oil/water mixture then flow through separate air and liquid lines into the three-phase gravity separator. Air, water and oil are separated by gravity. The air is exhausted into atmosphere after separation and cleaning in the three-phase separator. The water and oil from the three-phase separator enter their respective coalescers where liquids are further cleaned before returning to their respective tanks.

Inferential Slug Controller

A schematic overview of an embodiment of the slug controller used with the test rig was as shown in FIG. 2.

Because a key philosophy of the new slug control approach is to use the topside measurements only, the following topside measurements were fed to the controller:
1. The riser outlet pressure, P3
2. The topside separator pressure P4
3. The three-phase separator pressure P5
4. Level of liquid in the topside separator.
5. Gas outlet flow rate of the topside separator.
6. Liquid outlet flow rate of the topside separator.
7. Riser outlet mass flow rate from a Coriolis flow meter.
8. Riser outlet density from a Coriolis flow meter.
9. Hard count of a Gamma meter located at the riser outlet.
10. Soft count of a Gamma meter located at the riser outlet.

The last four measurements are not normally available in an offshore installation. Using a Coriolis flow meter for multiphase flow measuring has not been well accepted. It is notable that the signals of the Gamma meter were not calibrated for any flow properties, such as density and flow rate.

Figure 5:
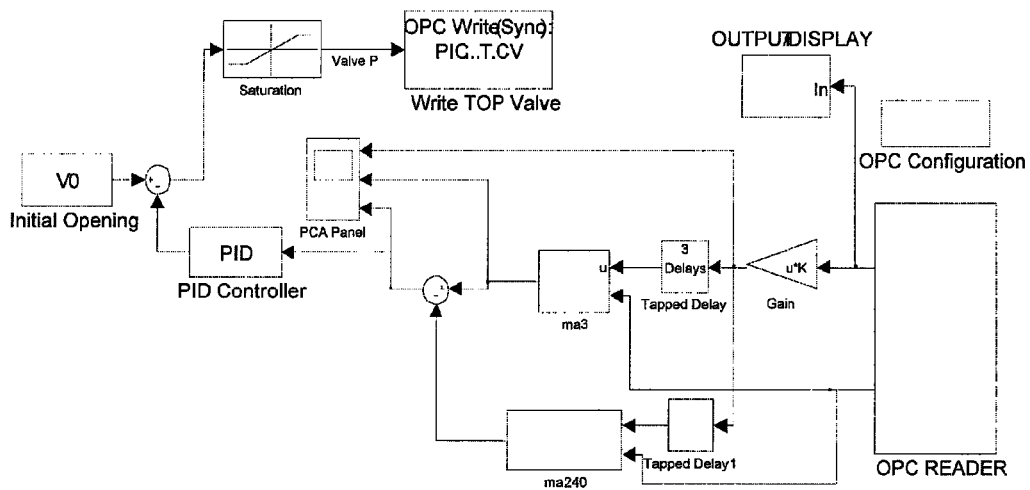
FIG. 5 is a SIMULINK® module of the slug controller used with the test rig of FIG. 4.

The inferential slug controller was implemented in a MATLAB®/SIMULINK® model. The controller communicated with the plant control system through an OPC link to get the first 8 measurements and to alter the choke valve position. The last two signals are obtained through a direct link with the Gamma meter. The SIMULINK® control model is shown in FIG. 5.

Measurement weights were calculated using the control variable algorithm described in the previous section by initially setting the valve manually to its maximum acceptable opening, and then observing samples of the signals from the sensors over a period of time. This produced a set of control parameters as given in Table 1 in Appendix A Experimental Results for Example 1

Figure 6:
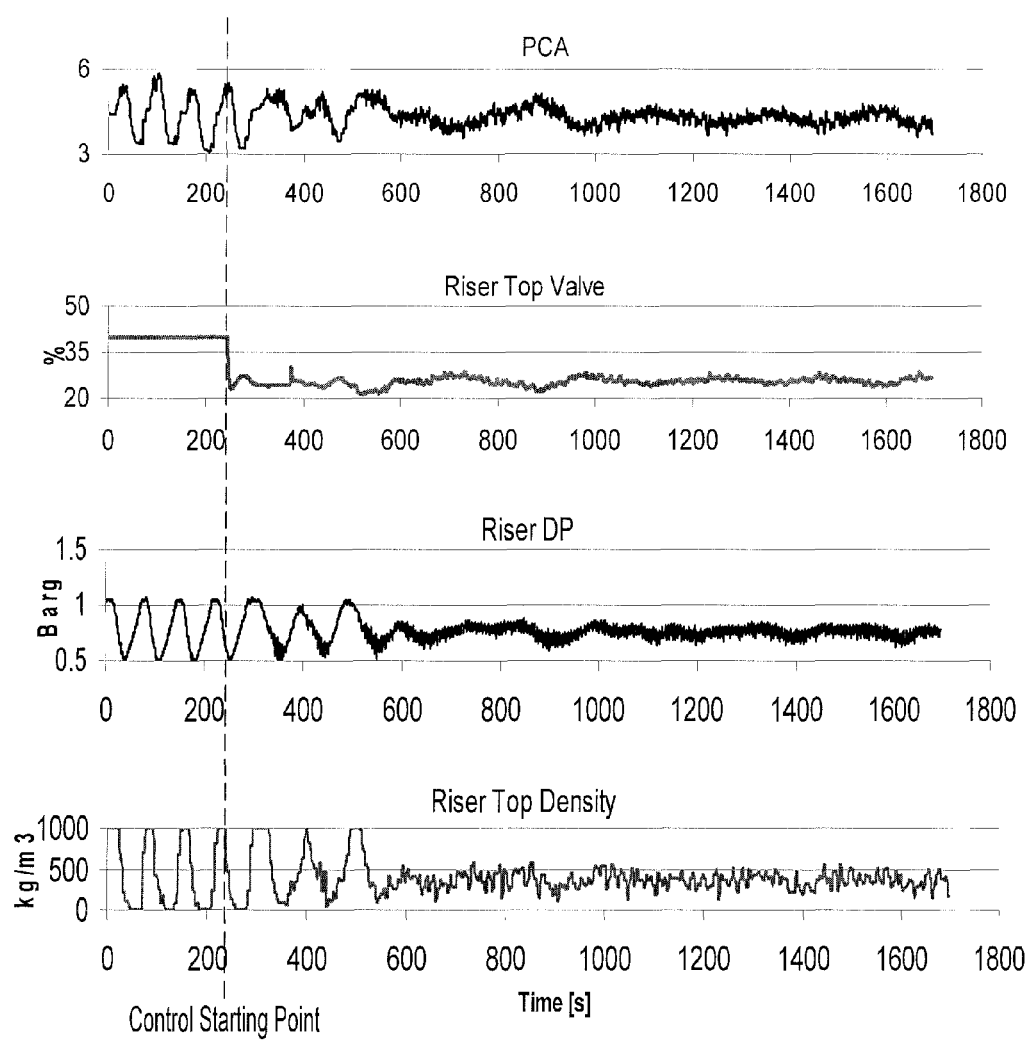
FIG. 6 is a set of data produced from slug control experiment I. 20 Sm$^3$/h of air and 2 kg/s of water.

Inferential slug control experiments were carried out using the control parameters of Table 1. In the first experiment, as shown in FIG. 6, the test flow condition was set as 20 Sm³/h of air and 2 kg/s of water. As shown in FIG. 6, the choke valve initially was manually fixed at 40%, at this condition, the maximum riser DP is above 1 bar indicating that the riser is periodically with a full column of water, hence is in severe slugging flow regime. At 200 second, the inferential slug control is switched on. As shown in FIG. 6, after three cycles, the system is stabilised and the choke valve opening was around 29%, which is higher than the maximum manual choking position to stabilise the riser under the same flow condition. Therefore, this would imply that the inferential slug control is able to increase production in a real oil field.

Figure 7:
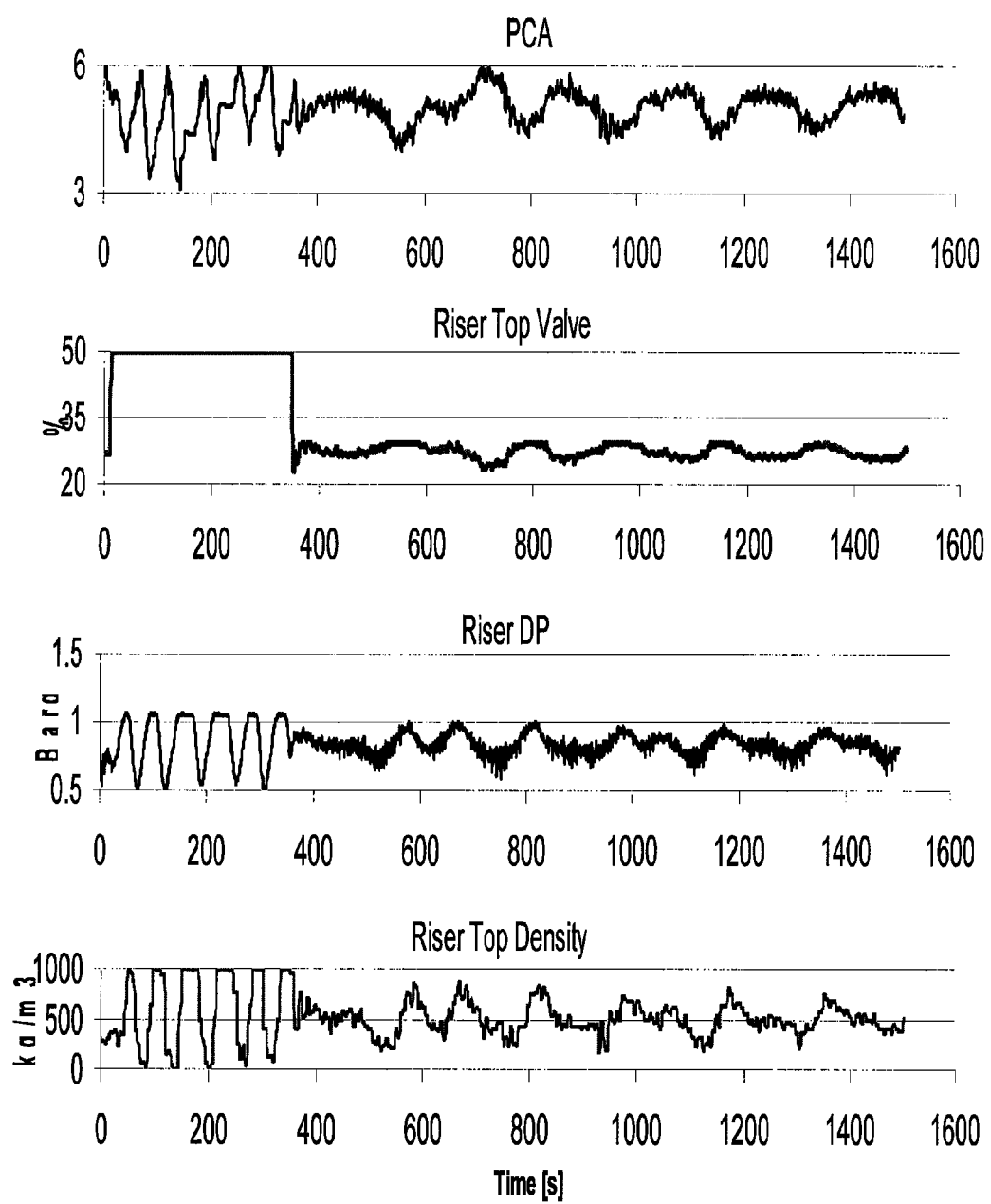
FIG. 7 is a set of data produced from slug control experiment 2, 20 Sm$^3$/h of air and 4 kg/s of water.

To demonstrate the robustness, the same controller parameters were applied to another severe slugging flow condition, 20 Sm³/h of air and 4 kg/s of water. As shown in FIG. 7, the experiment started when the choke valve position was fixed at 50%. After 200 seconds, the inferential slug controller was switched on. This time, the flow was stabilised immediately after starting the ISC. The finally choking valve position was about 25%, also higher than the position of manual choking to stabilise the riser under the same flow condition.

Figure 8:
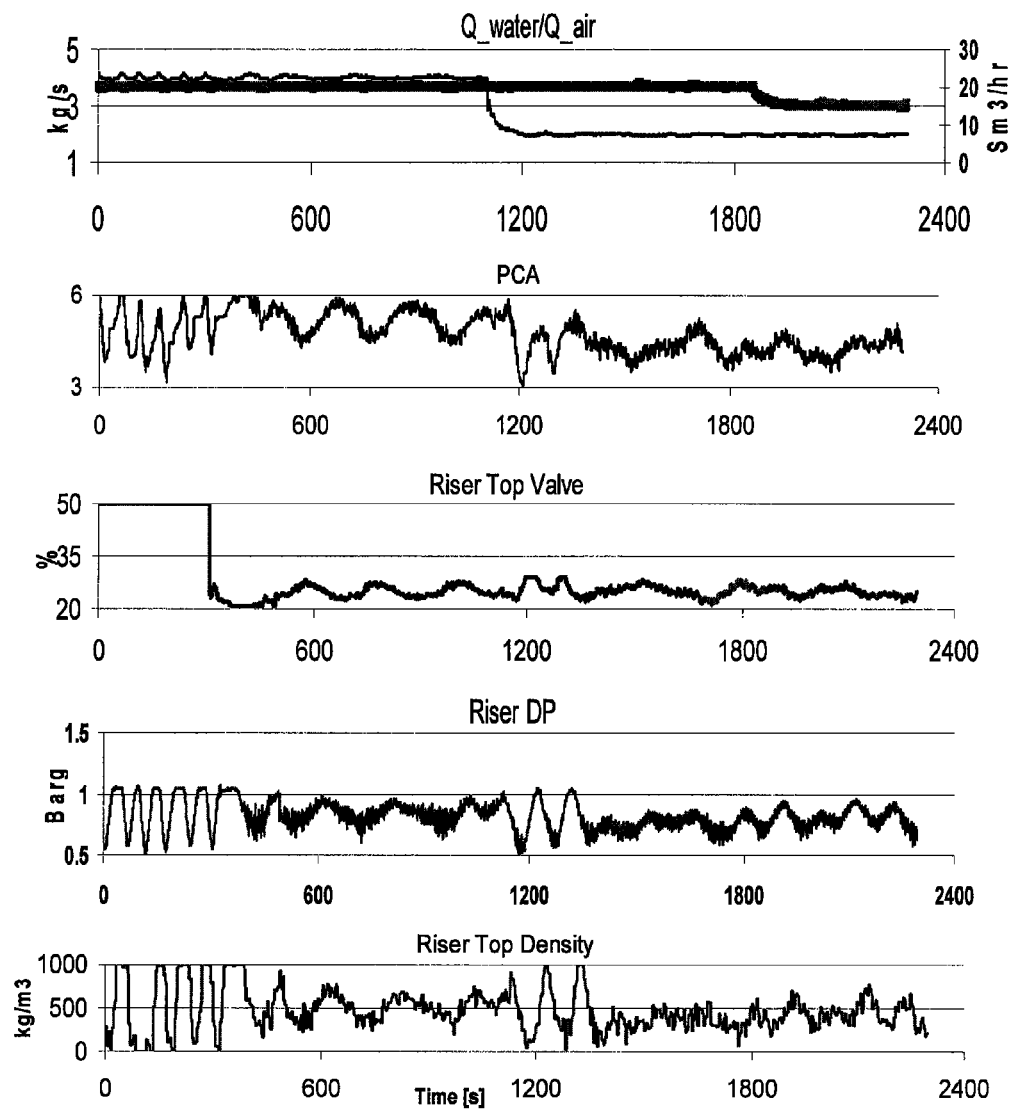
FIG. 8 is a set of data produced from slug control experiment 3, varying air and water flow rates.
Figure 15:
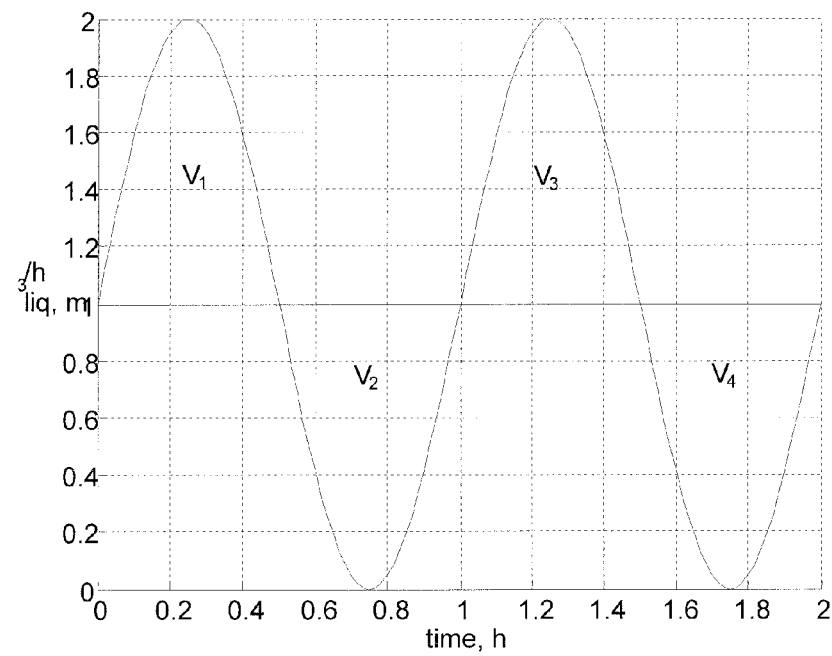
FIG. 15 is an illustration of the basis for producing a surge volume definition.

Finally, the robustness of the inferential slug controller was further tested by the experiment shown in FIG. 8. The experiment was started by setting the flow condition at 4 kg/s of water and 20 Sm³/h of air and choke valve fixed at 50% position. The flow was initially in severe slugging, but was immediately stabilised when the inferential slug control started at about 300 seconds. At about 1100 seconds, water flow rate was reduced to 2 kg/s. The inferential slug controller was able to cope with this disturbance and stabilised the flow again. Then at about 1800 seconds, the second disturbance was introduced to reduce air flow rate to 15 Sm³/s. Again, as shown in FIG. 8, the ISC successfully stabilised the flow without any problem.

The above experimental studies demonstrate the principle of using riser top measurements and its robustness. The impact on production will be investigated through OLGA simulation.

EXAMPLE 2

Simulation on a Real Field Model

Figure 9:
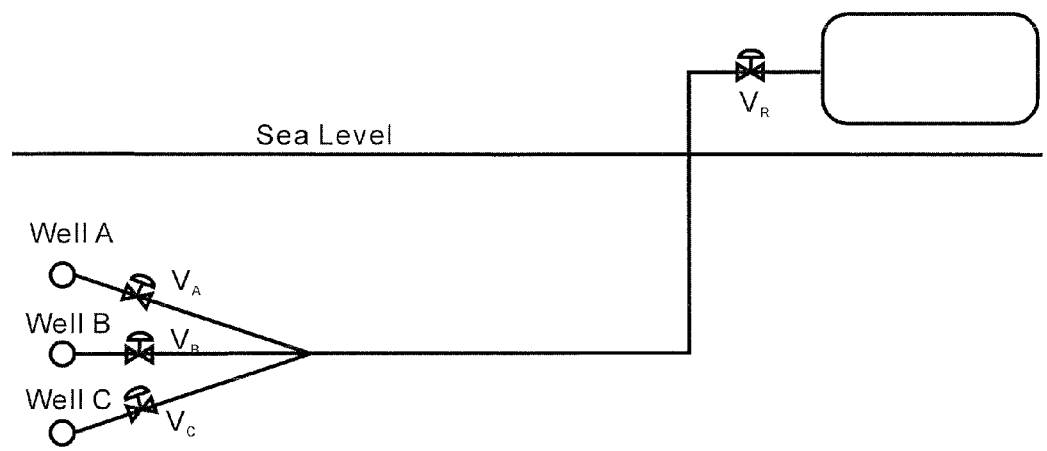
FIG. 9 is a real oil field OLGA model as used in a second example embodiment in accordance with the present invention.

Inferential slug control was also tested with an OLGA model, which represents a real oil field in North Sea. The model includes three wells, A, B and C, all are modelled as a pressure node in OLGA. Each well connects to a choke valve, which is adjusted to match the real oil field production rate. Another on-off valve is connected to each well to alter the operation mode with or without the well. Three wells are connected to a main manifold of 16 km length. The end of the manifold connects to a 150 m riser. A 108 m³ (3 m diameter and 15.4 m length) slug catcher is located at the outlet of the riser. The level and pressure of the slug catcher are controlled by PID control loops. Between the slug catcher and the riser outlet, an automatic choke valve is available for slug control. A schematic of the model is shown in FIG. 9.

The nominal gas flow rates of three wells and their choke valve positions are given in Table 2.

Figure 10:
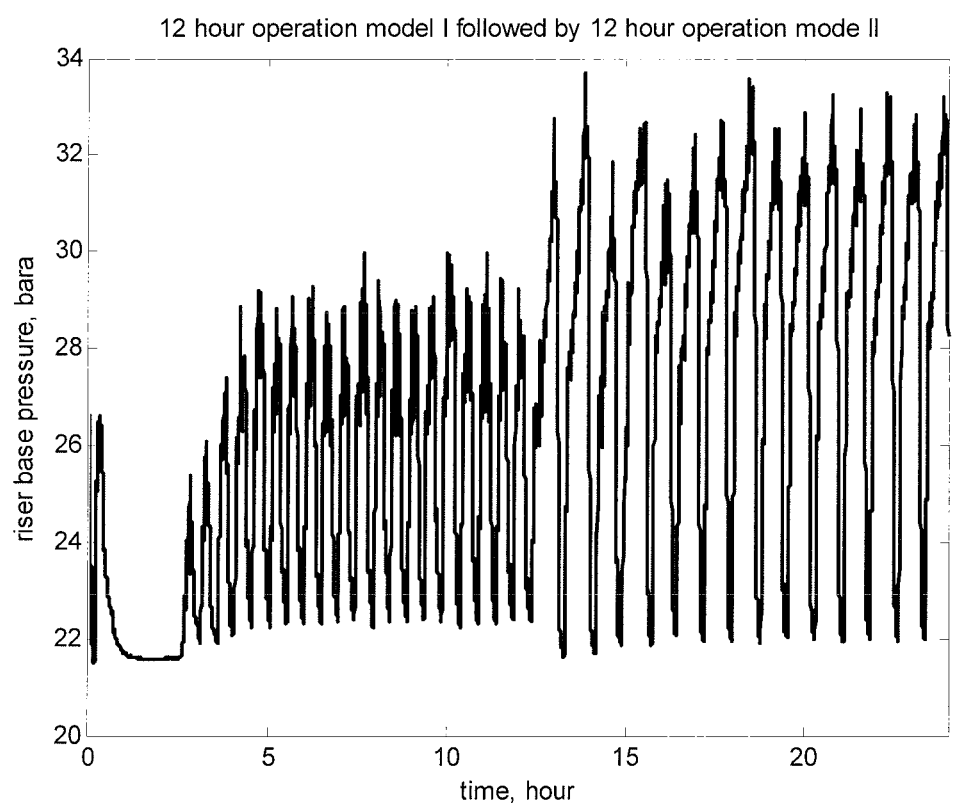
FIG. 10 is a plot of riser base pressure of 12-hour in operation mode I followed by 12-hour of operation mode II for the second example.

Two operation modes are considered with three wells: the operation mode I where all three wells are in operation, and the operation mode II, where only Well A is in operation. In both modes, severe slugging naturally occurs as indicated by the riser base pressure shown in FIG. 10.

Results of Manual Choke Simulation

Firstly, the model is studied by manually adjusting the choke valve. Bifurcation maps for the operation modes I and II are obtained as shown in FIGS. 11 and 12 respectively.

Figure 11:
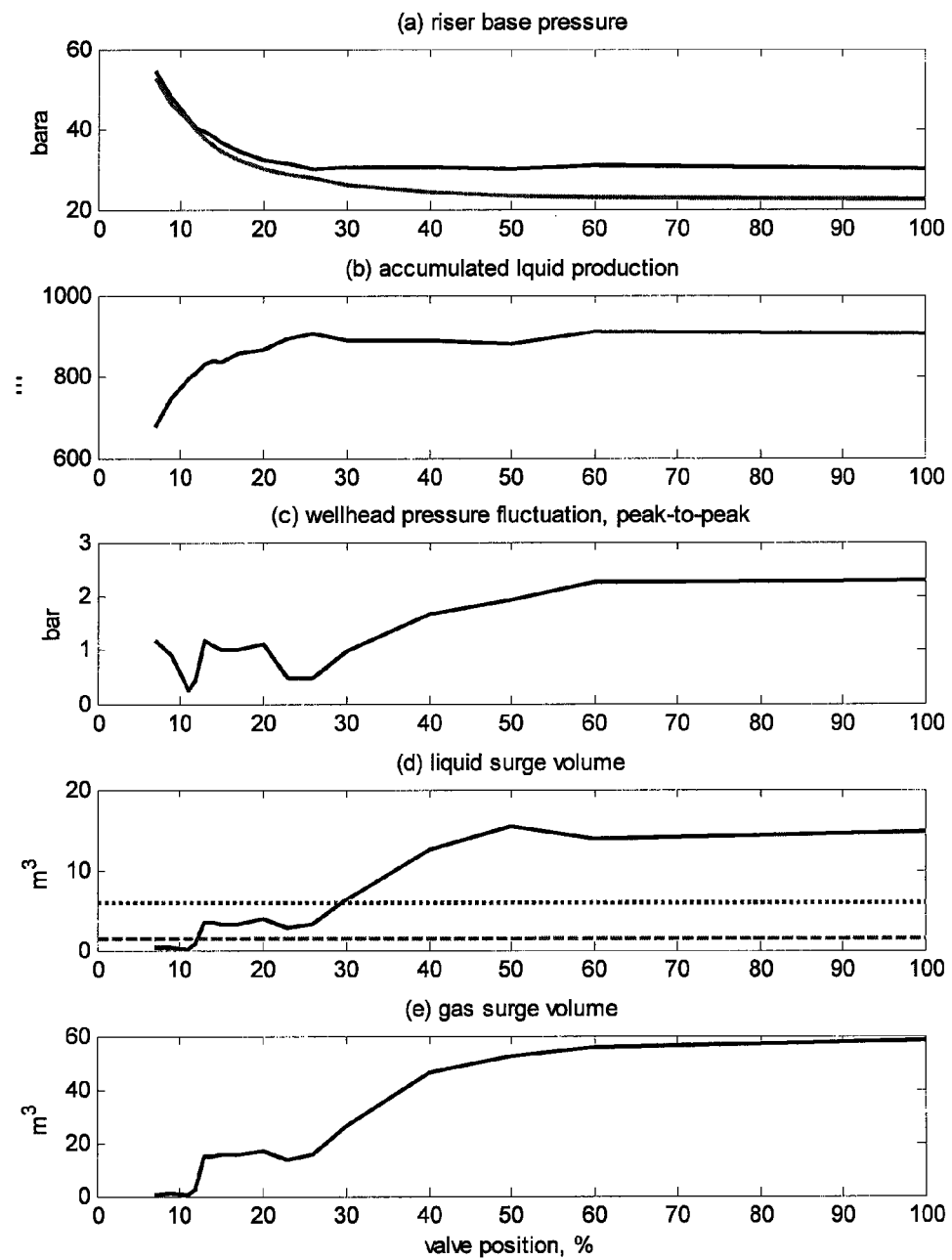
FIG. 11 is a Bifurcation map of operation mode I. (a) riser base pressure, (b) accumulated liquid production, (c) wellhead pressure peak-to-peak, (d) liquid surge volume and (e) gas surge volume against valve position.
Figure 12:
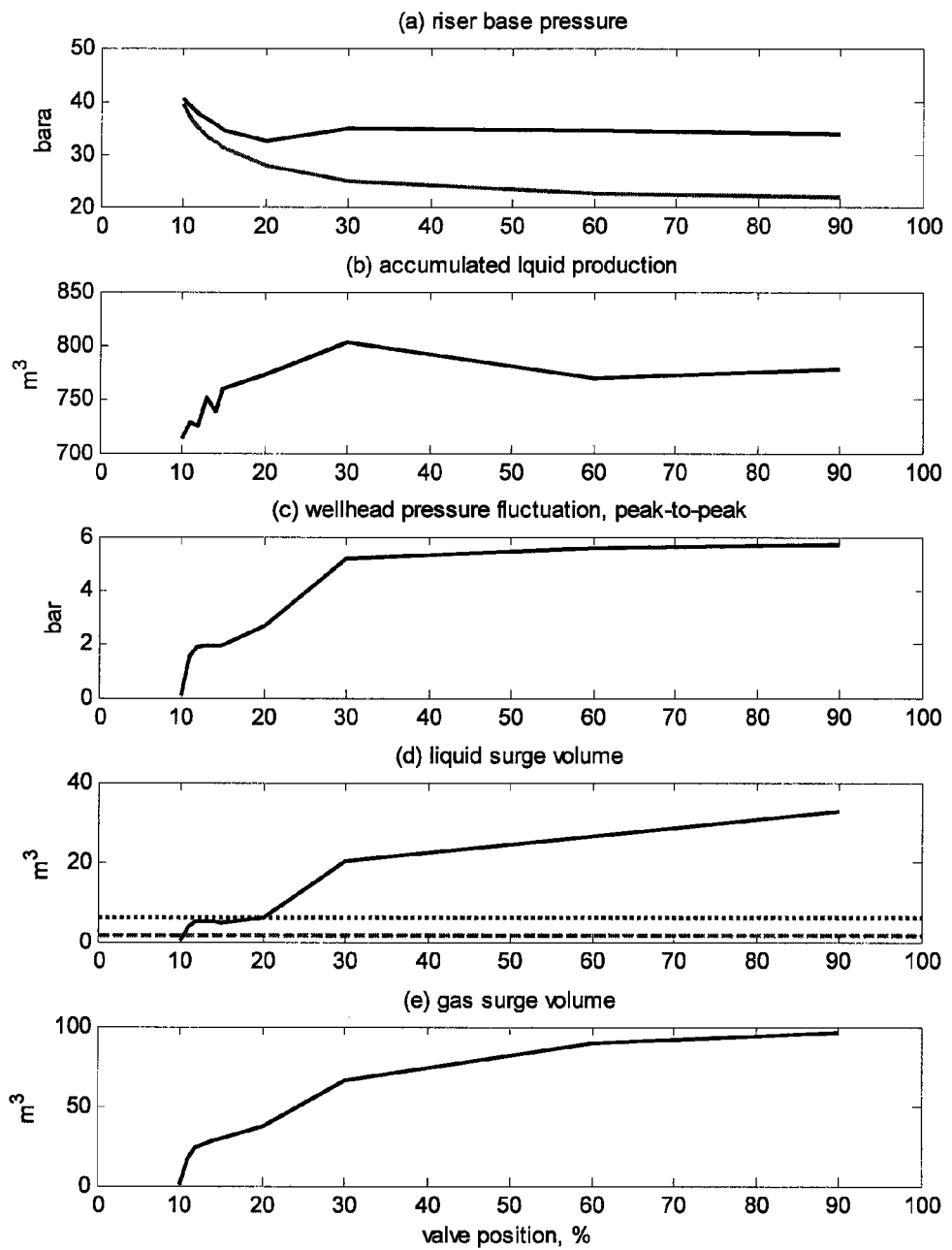
FIG. 12 is a bifurcation map of operation mode II. (a) riser base pressure, (b) accumulated liquid production, (c) wellhead pressure peak-to-peak, (d) liquid surge volume and (e) gas surge volume against valve position.

As shown in FIGS. 11 and 12, to satisfy the threshold of liquid surge volume, 1.5 m³, the maximum choke position for the operation modes I and II are 13% and 11% respectively. Therefore, performance criteria are evaluated at 13% choke positions for the operation mode I and 11% for the operation mode II shown in Tables 3 and 4 respectively. The evaluation is based on the last 12 hour results of a 24-hour simulation run.

Results of Inferential slug control simulation

The same type of measurements (from topside sensors) used in the Cranfield test rig experiment were used to compose the control variable. The measurements are determined based on simulation by fixing the choke valve at 13% and 11% for the operation modes I and II respectively. These weights and other control parameters are given in Tables 5 and 6 for the operation modes I and II respectively.

Figure 13:
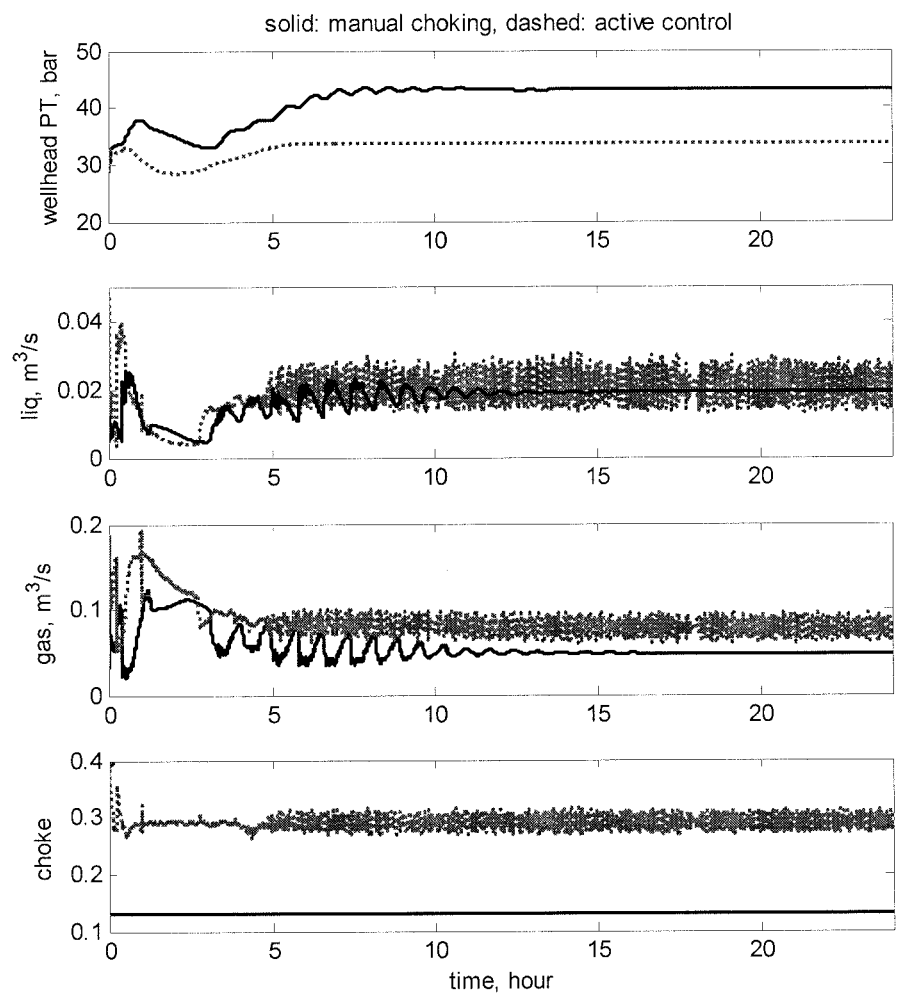
FIGS. 13 and 14 are a simulation result comparison of manual choking and inferential slug control (operation mode I) for the second example.

For the operation mode I, FIG. 13 shows a comparison of 24-hour simulation results obtained by fixing choke valve at 13% and by active control. For the operation mode II, FIG. 14 shows a comparison of 24-hour simulation results obtained by fixing choke valve at 13% and by active control. The performance criteria of both modes are evaluated in Table 7.

The results of the experiment clearly showed that the inferential slug control is able to increase production by 10% and 9.7% on the operation modes I and II respectively with all other criteria within satisfactory limits when considered against manual choking at 13 percent. Surprisingly, for the operation mode II, it was also found that the production achieved by the active control is even higher than that achieved when choke valve is fully open.

Appendix A

TABLE 1

Inferential slug control weighted parameters for Cranfield test rig

| Parameter | Value |
| --- | --- |
| Weight of riser top pressure | 1.272 |
| Weight of topside separator pressure | 0.890 |
| Weight of three phase separator pressure | 0.0907 |
| Weight of separator level | 0.100 |
| Weight of separator gas outlet flow rate | 0.149 |
| Weight of separator liquid outlet flow rate | 0.050 |
| Weight of riser outlet mass flow rate | 0.0109 |
| Weight of riser outlet density | 0.0003 |
| Weight of hard Gamma count | −1.60e−5 |
| Weight of soft Gamma count | −2.40e−5 |
| Control variable set-point | 0.672 |
| Control gain | 2.4 |
| Valve set-point | 29.0% |

TABLE 2

Wellhead choking and norminal gas flow rate

| Wells | Valve opening (%) | Gas Flow rate from operations (MMscf/d) |
| --- | --- | --- |
| A | 5.5 | 3.5 |
| B | 0.56 | 0.7 |
| C | 0.44 | 1.7 |

TABLE 3

Manual choking control performance, operation mode I

| Choke position | Accumulated Liquid production | Wellhead pressure peak-to-peak | Liquid surge volume | Gas surge volume |
| --- | --- | --- | --- | --- |
| 100% | 910.1 m³ | 3.50 bar | 18.68 m³ | 66.56 m³ |
| 13% | 823.6 m³ | 0.20 bar | 1.04 m³ | 4.72 m³ |

TABLE 4

Manual choking control performance, operation mode II

| Choke position | Accumulated Liquid production | Wellhead Pressure peak-to-peak | Liquid surge volume | Gas surge volume |
|---|---|---|---|---|
| 100% | 753.68 m³ | 6.41 bar | 33.59 m³ | 96.10 m³ |
| 11% | 723.11 m³ | 1.33 bar | 3.16 m³ | 15.2 m³ |

TABLE 5

Inferential slug control weighting parameters (operation mode I)

| Parameter | Value |
|---|---|
| Weight of riser top pressure, 1/bar | 1.4695 |
| Weight of riser top density, 1/(kg/m³) | 0.19891 |
| Weight of liquid mass flow rate, 1/(kg/s) | −0.83924 |
| Weight of gas volumetric flow rate, 1/(m³/s) | 246.03 |
| Weight of valve differential pressure, 1/bar | 1.2698 |
| Control variable set-point | 223.47 |
| Control gain (%) | −0.003 |
| Valve set-point (%) | 29 |

TABLE 6

Inferential slug control weighting parameters (operation mode II)

| Parameter | Value |
|---|---|
| Weight of riser top pressure, 1/bar | 1.4695 |
| Weight of riser top density, 1/(kg/m³) | 0.19891 |
| Weight of liquid mass flow rate, 1/(kg/s) | −0.83924 |
| Weight of gas volumetric flow rate, 1/(m³/s) | 246.03 |
| Weight of valve differential pressure, 1/bar | 1.2698 |
| Control variable set-point | 223.47 |
| Control gain (%) | 2e−4 |
| Valve set-point (%) | 20 |

TABLE 7

Inferential slug control performance criteria

| Mode | Choke position | Accumulated Liquid production | Wellhead pressure peak-to-peak | Liquid surge volume | Gas surge volume |
|---|---|---|---|---|---|
| I | 29% | 906.48 m³ | 0.091 bar | 0.61 m³ | 2.20 m³ |
| II | 29% | 793.46 m³ | 0.16 bar | 0.61 m³ | 0.84 m³ |

The embodiments of the invention in which an exclusive property or privilege is claimed are defined as follows:

1. A method of controlling the flow of a multiphase fluid through a pipeline of the kind in which a riser pipe is fitted with a choke valve which can be moved between an open position in which fluid can flow through the choke valve and a more closed position in which the flow of fluid through the valve is at least partially choked, the method comprising the steps of:
   in a first stage receiving multiple signals dependent on fluid flow properties from a plurality of sensors in a topside area of the riser pipe,
   analysing the signals to establish a vector of measurement weights derived from sampled values of the multiple signals, the product of the vector of measurement weights and a corresponding vector of the signal values of a given time being dependent on the severity of a slug flow forming in said pipeline at that time, and
   in a second stage receiving further signals dependent on fluid flow properties from the plurality of sensors in the topside area of the riser pipe,
   in a third stage determining a set position for the choke valve from the product of the vector of measurement weights and the further values of signals, and
   moving the choke valve to the set position in order to restrict characteristics of the flow in said topside area from moving towards a severely slugging flow regime.

2. A method according to claim 1, in which the first, second and third stages are carried out in that order.

3. A method according to claim 1, in which once the third stage is completed the method returns to the second stage, whereafter it loops continuously between the second and third stages.

4. A method according to claim 1, which comprises in the first stage, prior to collecting the samples to be analysed, setting a manual choke valve position and subsequently performing the step of analysing sampled values of the signals with the valve held in that position to determine weightings that form the weight vector.

5. A method according to claim 1, which sets the position of the choke valve according to a function of the following form: $V = V_0 + K(W^T Y - R)$.

6. A method according to claim 5, in which the valve set point $V_0$ is determined based on a manually set choke valve position where slug flow fluctuation can he reduced to a manageable level.

7. A method according to claim 5, in which the control variable $W^T Y$ represents a principal component which is a linear combination of weighted variables, each corresponding to one of the received signals.

8. A method according to claim 1, in which the measured signals are optimally weighted through a multivariable analysis technique.

9. A method according to claim 1, in which the vector of measurement weights is determined from samples of the signals obtained over an extended period of time.

10. A method according to claim 7, which selects the first principal component at any time as the control variable.

11. A method according to claim 7, which selects a combination of more than one principal component at any time as the control variable.

12. A method according to claim 1, which comprises processing only signals from sensors located at said topside area of the pipeline.

13. A method according to claim 1, in which no signal is required from a sensor of said riser pipe.

14. A method according to claim 1, which employs all available topside measurements from any provided sensors.

15. A method according to claim 1, in which in a fourth stage, to be performed after the first and second stages are complete, the method comprises monitoring over an evaluation period of time the valve position and one or more of the signals when the choke valve is under control of the method and updating an initial valve set point, and additionally or alternatively a control variable set point, and additionally or alternatively a control gain, and additionally or alternatively one or more weighting of the vector of measurement weights in response to the monitoring.

16. A method according to claim 15, in which the fourth stage is performed periodically or continuously while the method is looping between the second and third stages.

17. A method according to claim 15 in which during the monitoring and updating stage, a control variable set point is adjusted to a point derived by averaging a control gain.

18. A method according to claim 1 in which after an initial set-up, real-time measurements and corresponding valve position readings are collected and this information used to update control parameters so as to follow future flow condition changes and to improve production.

19. A non-transitory computer readable medium storing a set of program instructions which when operating on a processing apparatus cause the apparatus to function as a control unit of claim 2.

20. A controller suitable for use in controlling multiphase fluid flow in a pipeline comprising:
  a receiver arranged to receive during a first period of time multiple signals dependent on fluid flow properties from a plurality of sensors in a topside area of a riser pipe,
  an analyser arranged to analyse the signals to establish a vector of measurement weights derived from sampled values of the multiple signals, the product of the vector of measurement weights and a corresponding vector of the signal values of a given time being dependent on the severity of a slug flow forming in said pipeline at that time, and
  in which the receiver is arranged to receive further signals dependent on fluid flow properties from the plurality of sensors in the topside area of the riser pipe at a second period of time later than the first period of time,
  determining means arranged to determine a set position for a choke valve from the product of the vector of measurement weights and the further values of signals, and
  a valve actuator arranged to move the choke valve to the set position in order to restrict characteristics of the flow in said topside area from moving towards a severely slugging flow regime.

21. A controller according to claim 20, in which the vector of measurement weights comprises a principal component formed from a linear weighted combination of measurements whose value is sensitive to slug flow.

22. A controller according to claim 20 which includes a store for storing a control gain value, and valve set point value and a control variable set point value, and is arranged to produce a choke valve control signal according to a function of the form: $V = V_0 + K(W^T Y - R)$.

23. A system for use in controlling the flow of a multiphase fluid through a pipeline comprising:
  a riser pipe which is fitted with a choke valve which can be moved between an open position in which fluid can flow through the valve and a more closed position in which the flow of fluid is at least partially choked,
  a plurality of sensors, each producing a signal dependent on fluid flow properties in a topside area of the riser pipe,
  a control unit receiving signals from the sensors and controlling the movement of said choke valve, in which the control unit includes a processor running a program in the control unit which analyses the measurements to establish a vector of measurement weights for corresponding measurements, and which subsequently derives a control variable from the product of the vector of measurement weights and sampled values of the signals, the control variable comprising an indication of the severity of a slug flow forming in said pipeline, and
  in which the choke valve is arranged to receive signals from the control unit, the signals being dependent on the control variable in order to restrict characteristics of the flow in the topside area moving towards a severely slugging flow.

* * * * *